H. BELMER.
Bird-Cage.
No. 162,142.
Patented April 20, 1875.
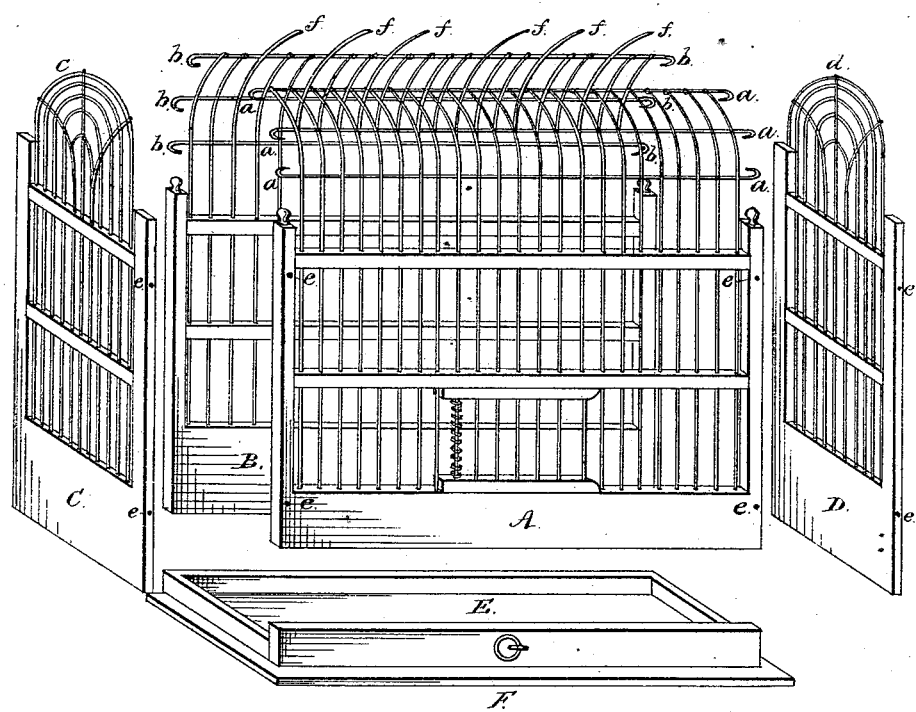

UNITED STATES PATENT OFFICE.

HERMAN BELMER, OF CINCINNATI, OHIO.

IMPROVEMENT IN BIRD-CAGES.

Specification forming part of Letters Patent No. 162,142, dated April 20, 1875; application filed March 30, 1875.

*To all whom it may concern:*

Be it known that I, HERMAN BELMER, of Cincinnati, in the county of Hamilton and State of Ohio, have invented certain Improvements in Bird-Cages, of which the following is a specification:

This invention relates to that class of bird-cages known as wood-frame mocking-bird, red-bird, or robin cages; and consists in making such cages in sections or parts, so that they may be packed for transportation in a much smaller space than if framed up or nested as usual, the parts to be put together to form cages when at their destination, and secured to each other by screws, &c., and projecting wires. The said parts or sections are two sides, two ends, and a bottom, with the bottom feed-pan or drawer, together with the bottle-holders and cage-handle. These are all manufactured separately, and so constructed that they can be packed in such a compact manner as to escape the injury and breakage incidental to transportation.

In the drawings, the figure is a perspective view of a cage constructed in sections, the several parts being disconnected.

Owing to the bulky and fragile character of these cages, as ordinarily constructed, they are an objectionable article for transportation, and very heavy rates of freight are charged on them. This has been partially remedied by "nesting" them; but to this the dealers object, as some sizes are more salable than others, and they thus have to carry unprofitable goods. All of these difficulties I overcome in my invention, which I will now proceed to describe.

The ordinary construction of cages is to make the frame-work solidly or joined together, and then wire it—that is, fix the necessary wires in position in said frame. Instead of this I make the sides, ends, and bottom of my cage in separate pieces. The sides A B are made with a frame-work, consisting of a base-piece, uprights or posts, and cross-ties, in which the wires are set; but, instead of extending continuously from one side to the other to form an arch over the cage, each side constitutes one-half of said arch, and the ends of said wires are bent over and clinched on ribs $a\ b$, extending the length of the frame, and having half-eyes or loops formed on their ends. On one of the sides some of the wires are left to project, as at $f$, for use in connecting the cage together. C D are the end pieces, made with a frame-work, in which the wires are fixed, of similar construction to that of the sides, and having the upper extremities of the wires arched to correspond with the curve of the arch of the sides. E is the removable bottom or drawer, constructed in the usual manner, and F is the wooden bottom.

In packing my cages, one side is fitted within the other, the drawer and bottom are placed on these, and the two ends placed together on top of these. Any number of sides, in pairs, together with their respective ends and bottoms, may be thus packed together, and it will be generally found that about three cages, in section, will occupy about as much space as one cage made up, besides being, thus packed, less liable to breakage or injury of any kind in transportation.

When the cages are to be put together, one or two screws are passed through holes $e$ in the sides, into the posts of the ends; the ends $f f$ are bent over the rib $a$, and clinched to complete the arch; the hooks or half-eyes on ribs $a\ b$ are clinched over the wires $d\ d$ on the ends, to secure them in place; the bottom F nailed to the frame-work of the sides and ends, and the drawer slipped in place, thus completing the cage. With each cage a handle and one or two bottle-holders and perches are packed, to be placed in position when the cage is made up.

Of course I do not limit myself to this form of cage, nor to the precise construction herein described, as there may be many variations of my invention without departing from its spirit.

I am aware that various articles of furniture, also packing-boxes, crates, and the like, have been made in detachable parts, to facilitate and lessen the cost of transportation; but such articles form no part of my invention.

Having thus described my invention, what I claim as new, and desire to secure by Letters Patent, is—

1. A bird-cage made in sections, and provided with wires $f$ and hooked ribs $a\ b$, for use in securing the same together, substantially as described.

2. A sectional bird-cage, having its parts secured together by projecting wires and hooks on its sides, and fastening devices passing through its sides into its ends, and through its bottom into its sides and ends, as specified.

To the above specification of my invention I have signed my name this 24th day of September, A. D. 1873.

HERMAN BELMER.

Witnesses:
W. H. PRUDEN,
A. J. PRUDEN.